UNITED STATES PATENT OFFICE.

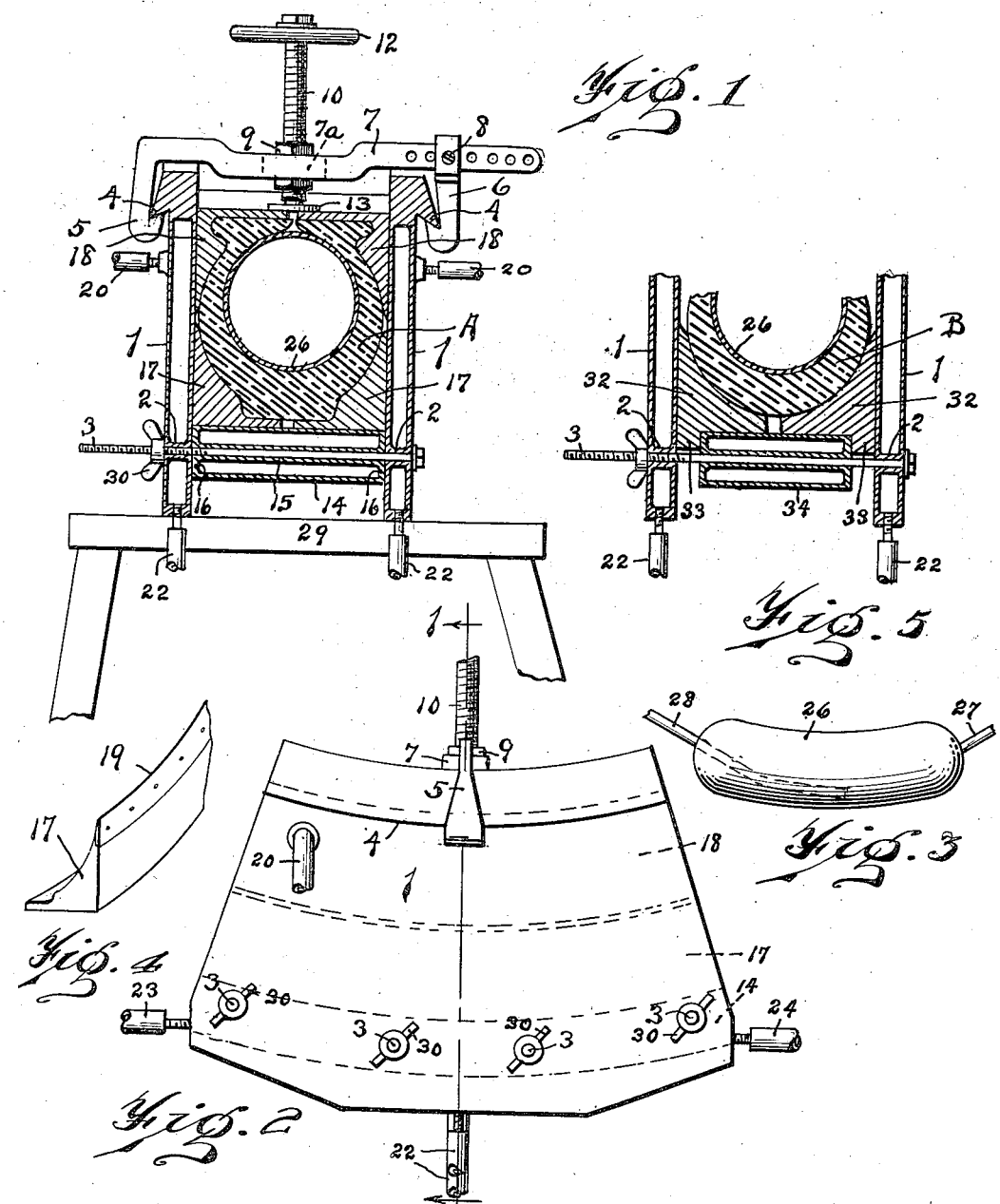

OSCAR M. FREDD, OF HANCOCK, MICHIGAN.

VULCANIZER.

1,373,807.  Specification of Letters Patent.  Patented Apr. 5, 1921.

Application filed December 6, 1920. Serial No. 428,527.

*To all whom it may concern:*

Be it known that I, OSCAR M. FREDD, a citizen of the United States, and residing at Hancock, in the county of Houghten and State of Michigan, have invented a new and Improved Vulcanizer, of which the following is a specification.

This invention relates to means for repairing the casings of pneumatic tires for motor vehicles by vulcanizing adhesive materials or patches into position, and its object is to provide a mold adapted for such purpose which may be assembled without the use of packing strips between the several parts and in which the several members may be so heated as to give the best results.

This invention consists in the details of construction illustrated in the accompanying drawing and particularly pointed out in the claims.

In the drawing, Figure 1 is a section of my improved vulcanizer on the line 1—1 of Fig. 2. Fig. 2 is a side elevation thereof. Fig. 3 is an elevation of a bag adapted to be placed within the casing and to be heated with steam. Fig. 4 is a perspective of a tread block. Fig. 5 is a section, similar to the lower part of Fig. 1, of a modified form of mold.

Similar reference characters refer to like parts throughout the several views.

Cuts in the rubber exteriors of automobile tire casings may often be closed so as to make the casing as good as before by filling in some uncured or unvulcanized rubber and then heating that portion of the casing to above the temperature where rubber vulcanizes while maintaining a pressure thereon. In other cases, patches may often be applied to casings to great advantage. The molds for this purpose may be heated to the desired temperature by steam under pressure, which may be obtained at any convenient source. When the mold is made of sections, a few extra parts permit such molds to take care of casings of many different sizes.

In Figs. 1 and 2 I have shown the side heating chambers 1 provided with integral thimbles 2 through which the assembling bolts 3 may pass, and with the flanges 4, preferably inclined, to receive the hooks 5 and 6. The hook 5 is shown attached to the bar 7 on which the hook 6 is slidable, a pin 8 positioning the hooks relative to each other. A nut 9 in this bar 7 receives the screw 10 which may have a hand wheel 12 at its upper end and a plate 13 at the lower end.

Between the side chambers 1 is the hollow base block 14 whose upper and lower surfaces are preferably cylindrical and which has tubular connectors 15 between the parallel side walls 16, the bolts 3 being adapted to extend through these connectors. On the base block are mounted the tread blocks 17 which are formed to fit one particular size and type of casing although in many cases they may be used for casings which vary somewhat in type and in both internal or tube diameter and wheel diameter. A pair of bead blocks 18 complete the installation and these may also usually be used for several types and sizes of tires. The tread blocks and bead blocks are generally triangular in cross section and may be formed of cast iron with steel edge strips 19 attached thereto, as shown in Fig. 4, so as to avoid chipping of these edges.

Each side chamber 1 is preferably provided with a feed connection 20 to supply steam and a drain connection 22, while the base block 14 may have the feed connection 23 and discharge connection 24. Heat may thus be applied at the exact point desired and waste of steam prevented. In order to secure proper pressure between the casing and the bead and tread blocks and also to assist in attaining the desired temperature, I provide a steam bag 26 for each inner diameter of casing, which bag has an inlet tube 27 for steam and a discharge tube 28, the latter preferably extending to the middle of the bag so that it may drain off the condensed water at all times. Both of these tubes are preferably flexible.

When a casing A has been prepared for vulcanizing, the sides, tread blocks and base of the mold are loosely assembled on any desired support 29 and the casing A with the inserted steam bag is placed within the mold with the part to be repaired central of the length of the mold. The bead blocks are then inserted, the locking bar 7 and its hooks 5 and 6 positioned and the screw 10 turned down to bring the plate 13 against the bead blocks. The thumb nuts 30 on the bolts 3 are then turned down to lock the sides and base together, the screw 10 is turned to complete the desired pressure on the bead blocks, and steam is turned into the bag 26, into the base and into the side 1 next the injury. As the temperature of the steam may be determined by the pressure, accurate control of the operation of this device is possible and satisfactory vulcanizing assured.

The base block need not be wide enough to engage the sides 1, as the tread blocks 32 (Fig. 5) may have flanges 33 to extend down on each side of the base block 34 between it and the side chambers 35. This view also shows a smooth casing B having no such central wearing tread as on the casing A in Fig. 1. This structure also results where the base member 34 is not of sufficient width to accommodate the larger tires, but by the use of the tread blocks 32, larger sizes of tires may be repaired.

The engaging sides of the several members are preferably quite exactly finished, but the extreme accuracy necessary when such engaging sides necessarily make steam tight joints, even when packing is used, need not be had in the present structure.

The nut 9 is shown with flanges above and below the cross bar 7 which is formed with a slot 7ª to permit the nut to be slid longitudinally of this cross bar to suit it to different sizes of tires. The hooks 5 and 6 are preferably widened at their lower ends where they engage the flanges 4, as shown in Fig. 2, in order to prevent the bar 7 from tipping. It will be understood that the strips 19 on the tread and bead blocks may be of any desired width, depending on the ideas of the designer.

The details and proportions of the various parts may all be changed by those skilled in the art without departing from the spirit of my invention as set forth in the following claims.

I claim:—

1. In a tire vulcanizer, the combination of hollow side chambers and a hollow base block between them, said parts having alined passages, bolts extending through the passages, pipes to supply steam to said members, tread blocks and bead blocks adapted to fit around a tire casing between said sides, and means to press the bead blocks toward the tread blocks.

2. In a tire vulcanizer, the combination of hollow side chambers and a hollow base block between them, said parts having alined passages, bolts extending through the passages, pipes to supply steam to said members, tread blocks and bead blocks adapted to fit around a tire casing between said sides, means to press the bead blocks toward the tire blocks, a flexible bag adapted to fit within the tire casing, and means to supply steam to said bag.

3. In a tire vulcanizer, the combination of hollow side chambers and a hollow base block between them, said parts having alined passages, bolts extending through the passages, pipes to supply steam to said members, tread blocks and bead blocks adapted to fit around a tire casing between said sides, means to press the bead blocks toward the tire blocks, a flexible bag adapted to fit within the tire casing, and means to supply steam to said bag, said means consisting of a supply tube connecting to one end of the bag and a discharge tube extending into the other end of the bag to about the middle thereof.

4. In a vulcanizer, the combination of hollow side chambers and a hollow base block between them, means to secure them together, pipes to supply steam to said members, tread blocks separate from the base block and bead blocks adapted to fit around a tire casing between the side chambers, and means connected to the upper edges of said sides to force the bead blocks toward the tread blocks.

5. In a vulcanizer, the combination of hollow side chambers and a hollow base block between them, means to secure said members together, pipes to supply steam to said members, tread blocks and bead blocks of generally triangular cross section adapted to fit around a tire casing between the side chambers, said side chambers having downwardly and outwardly inclined flanges along their upper edges, a cross bar extending across the top of said side chambers, hooks attached to said bar and engaging said flanges, one of said hooks being adjustable on said bar, said bar having a nut between said side chambers, a screw mounted in said nut, and a plate at the lower end of said screw adapted to engage the bead blocks which may be forced toward the tread blocks by said screw.

6. In a tire vulcanizer, the combination of hollow side chambers and a hollow base block between them, said parts having alined passages, bolts extending through the passages, pipes to supply steam to said members, tread blocks and bead blocks adapted to fit around a tire casing between said sides, and means to press the bead blocks toward the tire blocks, the side chambers and the base block having tubes extending between their walls and integral therewith to receive said bolts and prevent leakage of steam.

OSCAR M. FREDD.